(12) United States Patent
Ding

(10) Patent No.: US 7,567,713 B2
(45) Date of Patent: Jul. 28, 2009

(54) METHOD UTILIZING INTENSITY INTERPOLATION FOR MEASURING EDGE LOCATIONS IN A HIGH PRECISION MACHINE VISION INSPECTION SYSTEM

(75) Inventor: Yuhua Ding, Kirkland, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 730 days.

(21) Appl. No.: 11/350,590

(22) Filed: Feb. 8, 2006

(65) Prior Publication Data

US 2007/0183666 A1    Aug. 9, 2007

(51) Int. Cl.
G06K 9/48 (2006.01)
G06K 9/00 (2006.01)

(52) U.S. Cl. ...................... 382/199; 382/141
(58) Field of Classification Search ................. 382/199, 382/195, 201, 203, 298, 141–152; 348/86–95, 348/125–134
See application file for complete search history.

(56) References Cited

U.S. PATENT DOCUMENTS

| | | | | |
|---|---|---|---|---|
| 6,002,793 | A * | 12/1999 | Silver et al. ................. | 382/152 |
| 6,061,467 | A | 5/2000 | Michael | |
| 6,175,644 | B1 * | 1/2001 | Scola et al. ................. | 382/141 |
| 7,003,161 | B2 | 2/2006 | Tessadro | |
| 7,030,351 | B2 | 4/2006 | Wasserman et al. | |
| 2003/0095700 | A1 | 5/2003 | Yu et al. | |
| 2003/0206667 | A1 | 11/2003 | Wang et al. | |
| 2005/0031191 | A1 | 2/2005 | Venkatachalam | |
| 2005/0213807 | A1 | 9/2005 | Wasserman et al. | |
| 2006/0023937 | A1 | 2/2006 | Tessadro | |
| 2006/0093205 | A1 | 5/2006 | Bryll et al. | |

OTHER PUBLICATIONS

U.S. Appl. No. 11/185,561, filed Jul. 20, 2005, Blanford et al. [not yet published].
QVPAK 3D CNC Vision Measuring Machine Operation Guide, Version 2.0, Manual No. 4911GB, Series No. 359, Mitutoyo Corporation & Micro Encoder Inc., Kanagawa, Japan, Sep. 1996.
QVPAK 3D CNC Vision Measuring Machine User's Guide, Version 7.0, 1st ed., Manual No. 99MCB225A, Series No. 359, Mitutoyo Corporation & Micro Encoder Inc., Kanagawa, Japan, Jan. 2003.
Rockett, P., "The Accuracy of Sub-Pixel Localisation in the Canny Edge Detector," *Proceedings of the British Machine Vision Conference 1999*, Nottingham, United Kingdom, Sep. 13-16, 1999, pp. 392-400.

\* cited by examiner

*Primary Examiner*—Sherali Ishrat
(74) *Attorney, Agent, or Firm*—Christensen O'Connor Johnson Kindness PLLC

(57) ABSTRACT

A method for operating a video tool to perform precision edge detection in an image. The method includes determining estimated image intensity values corresponding to positions along a straight line aligned with a defined scan line orientation. The location of an edge point along the straight line is determined based on the estimated intensity values and their positions along the straight line. The method reduces sub-pixel orientation-dependent variations that may otherwise be present in edge measurements. Intensity values may be estimated by interpolating between nearest neighbor image pixel intensity values. When positions along the straight line are chosen to coincide with a pixel row or column, the interpolating may be linear interpolation between the intensities of just two adjacent pixels.

17 Claims, 13 Drawing Sheets

METHOD UTILIZING INTENSITY INTERPOLATION FOR MEASURING EDGE LOCATIONS IN A HIGH PRECISION MACHINE VISION INSPECTION SYSTEM

FIELD OF THE INVENTION

The invention relates generally to machine vision inspection systems, and more particularly to a method utilizing intensity interpolation for measuring edge locations in a high precision machine vision inspection system.

BACKGROUND OF THE INVENTION

Precision machine vision inspection systems can be used to obtain precise dimensional measurements of inspected objects and to inspect various other object characteristics. A user interface for such systems may generally include, among other things, various video tools that a user may position to find the location of edges in an image of a workpiece, while having little or no knowledge of the image processing that is needed for performing edge detection operations. One exemplary prior art system having such features, of a type that can be characterized as a general-purpose "off-line" precision vision inspection system, is the commercially available QUICK VISION™ series of vision inspection machines and QVPAK™ software available from Mitutoyo America Corporation (MAC), located in Aurora, Ill. The features and operation of the QUICK VISION™ series of vision inspection machines, and the QVPAK™ software, including the user interface and various video tools are generally described, for example, in the QVPAK 3D CNC Vision Measuring Machine Users Guide, published January 2003 and the QVPAK 3D CNC Vision Measuring Machine Operation Guide, published September 1996, each of which is incorporated herein by reference in its entirety. This product, as exemplified, for example, by the QV-302 Pro model, uses a precision positioning system, controllable lighting, a CCD array or the like, and a microscope-type optical system, to provide inspection images of a workpiece at various magnifications.

Such general-purpose "off-line" precision vision inspection systems are characterized by their versatility, and they typically provide the ability for a user or an automatic program to rapidly change their configuration and imaging parameters in order to perform a wide variety of inspection tasks on various types of objects or inspection workpieces, or various aspects of a single workpiece. It is generally desirable that such systems include features and video tools that make the operation of such systems simple and robust, such that precision inspection operations can be performed reliably by "non-expert" operators.

However, users continue to expect higher measurement accuracy from precision vision inspection systems. Error sources that were previously unrecognized and/or insignificant are becoming significant. However, systems and video tools that provide improved accuracy must nevertheless remain economical, provide high throughput, and provide simple and robust operation, such that precision inspection operations can be performed reliably by "non-expert" operators. Systems and video tools that meet these needs would be desirable.

SUMMARY OF THE INVENTION

It has been determined that certain existing systems produce different measurement and/or location results for a given feature depending on the orientation of the feature in the field of view. Thus, there is a need for improved systems that eliminate these measurement variations and the associated errors. The present invention is directed to an improved method for operating a video tool to measure edge locations in a high precision machine vision inspection system, and more particularly to a method that reduces or eliminates sub-pixel edge location errors that arise in association with certain orientations of edges in an inspection image. The method may be implemented such that no calibration or look-up table is required, such that high throughput is provided, such that previously established edge detection algorithms may be used, and such that the user need not recognize the conditions that cause of the underlying errors or perform special operations to overcome them. It should also be appreciated that certain existing machine vision inspection systems can employ various embodiments of the methods according to this invention with minimal "retrofit" modifications to the existing software for the machines.

In accordance with another aspect of the invention, an interpolation method is utilized for generating intensity profiles corresponding to nominal "scan lines" which are utilized for determining edge locations. The orientation and/or location of each nominal scan line may be determined based on a video tool's orientation and/or configuration parameters. The intensity profile associated with each scan line is generated using a designated interpolation method that allows the data points of the intensity profile to coincide to a very high degree with the nominal scan line, or with a straight line oriented at least approximately parallel to, and close to, the nominal scan line. The intensity profile(s) may then be analyzed using an edge detection algorithm to determine an edge location of the underlying feature, with high precision. Importantly, this method may be incorporated into existing machine vision inspection software methods such that neither the algorithm for generating the nominal scan line locations nor the algorithm for finding the edge position are required to be modified.

In accordance with another aspect of the invention, in one embodiment the interpolation method that is utilized for generating the intensity profile data points associated with a scan line is a bilinear interpolation method. The intensity of each data point along the intensity profile is calculated using the intensities of the four nearest neighbor pixels in the bilinear interpolation calculation.

In accordance with another aspect of the invention, in one embodiment, the intensity profile data points (locations) are chosen such that linear interpolation may be used along at least one coordinate direction when generating the intensity profile. For example, intensity profile data points are selected such that at least one of the two coordinates of each point is an integer (i.e. lines up with a pixel row or column), thus allowing linear interpolation of the pixel intensities to be used along one of the coordinate axes, with high accuracy. In this implementation, the distance between the intensity profile data points may vary, depending on the scan line orientation. Such implementations improve the computation efficiency without compromising the resulting edge detection accuracy.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
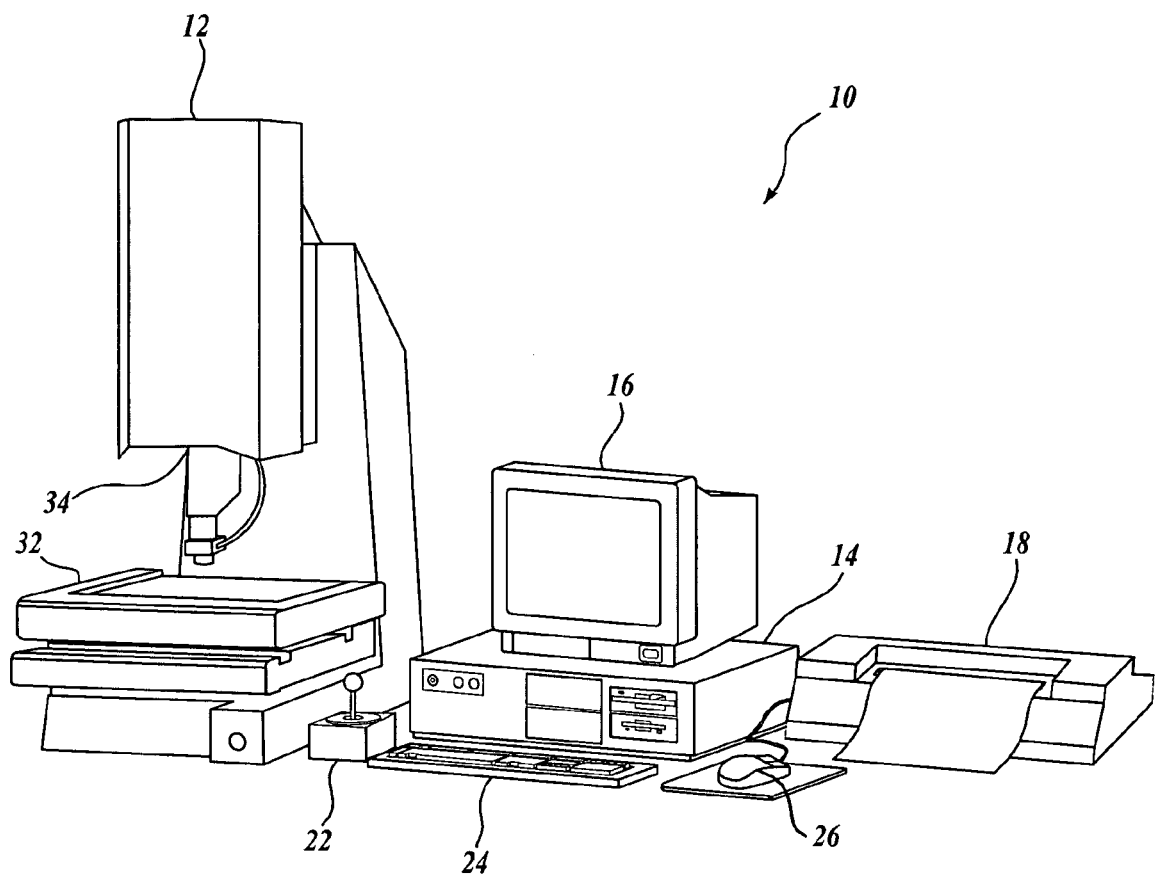
FIG. 1 is a diagram of one exemplary general purpose machine vision and inspection system.

FIG. 1 is a block diagram of one exemplary machine vision inspection system 10 usable in accordance with the present invention. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in copending and commonly assigned U.S. patent application Ser. No. 10/978,227, which is hereby incorporated by reference in its entirety. Various aspects of vision measuring machines and control systems are also described in more detail in copending and commonly assigned U.S. patent application Ser. No. 10/808,948, filed Mar. 25, 2004, and Ser. No. 10/632,823, filed Aug. 4, 2003, which are also hereby incorporated by reference in their entirety.

As described in more detail in the '948 and '823 applications, the machine vision inspection system 10 may include a control system portion which is usable to recall captured and stored workpiece inspection images, to inspect and analyze workpiece features in such workpiece inspection images, and to store and/or output the inspection results. These analysis and inspection methods are typically embodied in various video tools included in a video tool portion of a memory. Some of these tools, including edge detection tools, dimension measuring tools, auto focus tools, and the like, for example, are routinely available in a variety of commercially available machine vision inspection systems, such as the QUICK VISION® series of vision systems and the associated QVPAK® software, discussed above. Various video tools are also described in co-pending and commonly assigned U.S. patent application Ser. No. 09/987,986, filed Nov. 16, 2001; Ser. No. 10/719,210, filed Nov. 24, 2003; Ser. No. 10/903,714, filed Jul. 30, 2004 and Ser. No. 11/185,561, filed Jul. 20, 2005 each of which is hereby incorporated by reference in its entirety. As will be described in more detail below, the present invention is used in combination with various video tools (e.g., point, box, and circle tools, etc.) in order to improve the accuracy and consistency of their measurements.

Figure 2:
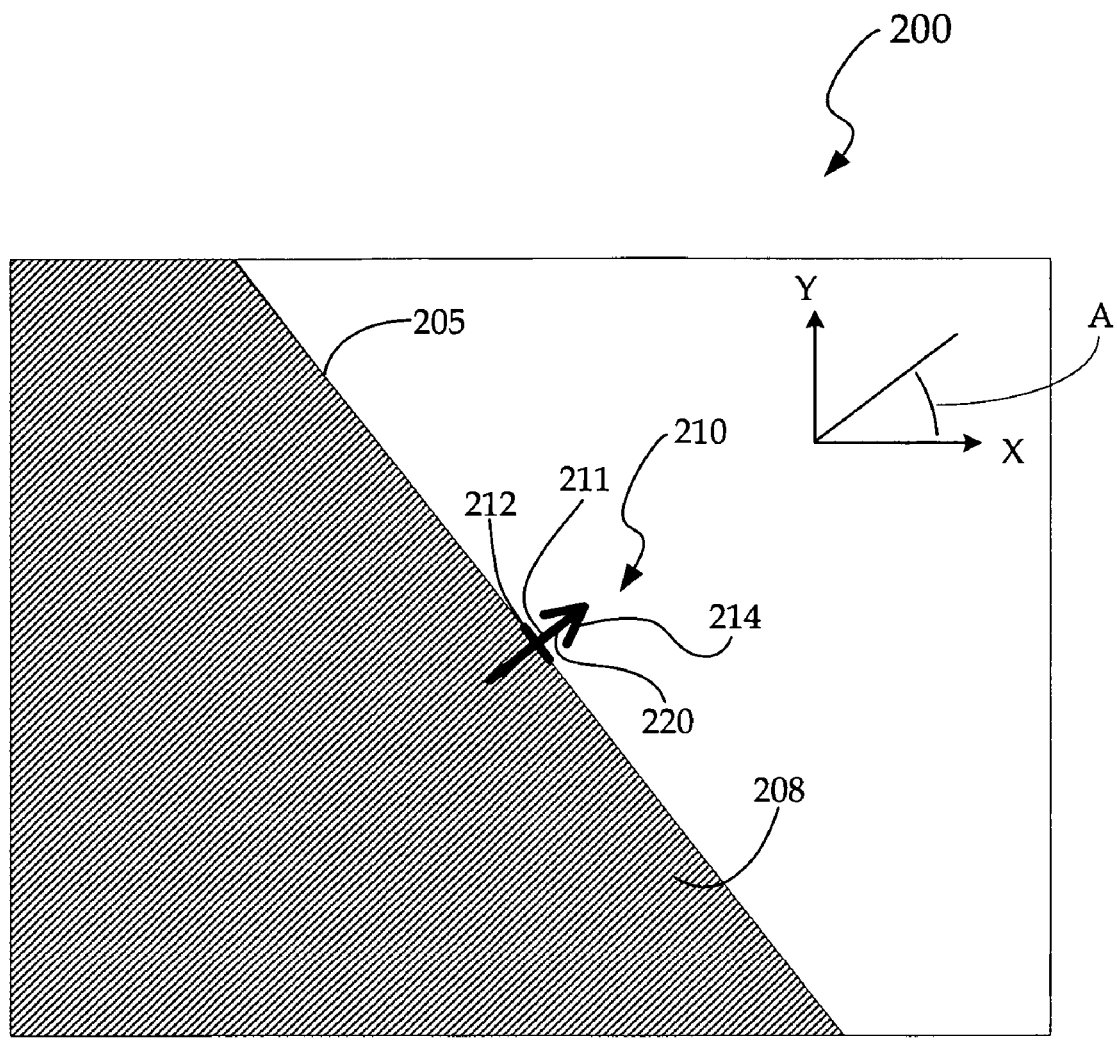
FIG. 2 is a diagram of an exemplary point tool overlaying an edge in an image.

FIG. 2 is a diagram of an exemplary point tool 210 overlaying an edge 205 at the boundary of a darker or shaded area 208 in an image 200 (e.g., on an image display device). In FIG. 2, as well as figures described below, shaded areas such as the shaded area 208 are shown for purposes of illustration, to indicate relatively lower intensity pixels in an image. As will be described in more detail below, the point tool 210 may be configured for determining the location of an edge point in the image, and similar operations may underlie the operation of another type of tool (e.g., a box-type edge tool) that locates multiple edge points. A graphical user interface of the point tool 210 may include a body 211, an edge selector 212 and a polarity indicator arrowhead 214. The arrowhead 214 may generally point from light-to-dark, or dark-to-light, across an edge to enhance edge-finding reliability in certain situations, as explained in the incorporated references. In the illustration of FIG. 2, the body 211 obscures a nominal scan line 220 defined by, and nominally coinciding with, the body 211. Scan lines will also be illustrated and described in more detail below with reference to FIGS. 3 and 4.

In operation, the user selects the point tool 210 (e.g., from a video tool bar at the edge of the display) and identifies an edge feature to be detected by placing the body 211 over the edge feature and the edge selector 212 as close as possible to the edge, at a desired location along the edge. The point tool body 211 may be oriented to define and indicate a desired scan line orientation across the edge, as indicated by the angle A in the illustrated x-y coordinate system in the upper right corner of FIG. 2. In FIG. 2, and other figures herein, image pixels are arranged in rows along the x-coordinate direction and columns along the y-coordinate direction. Thus, the angle A indicates a nominal scan line orientation angle relative to the pixel rows in an image. The arrow 214 points along a reference direction or polarity to be associated with the edge detection. In operation, once the point tool 210 is completely configured, the instructions of an underlying edge point locating routine may be executed to perform operations that analyze intensity profile data points (e.g., pixel intensity data) associated with a scan line that nominally coincides with the body 211 of the point tool 210, and performs various operations to detect the edge location of the underlying feature. As will be described in more detail below with respect to FIG. 5, in various exemplary embodiments, the edge point locating routine of the point tool 210 may determine an edge location based on the magnitude of the gradient along an intensity profile associated with the scan line.

Figure 3:
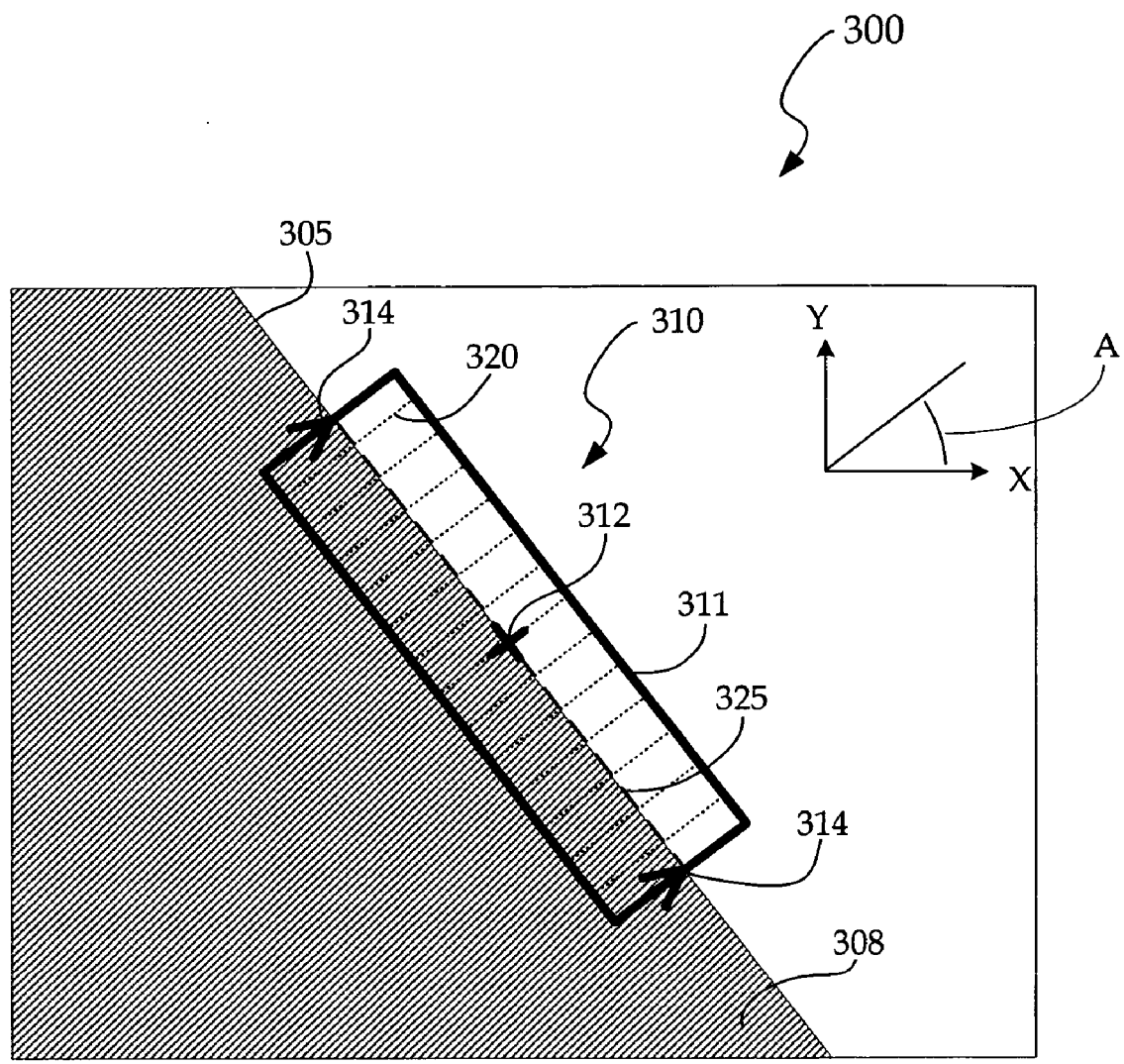
FIG. 3 is a diagram of an exemplary box tool overlaying an edge in an image.

FIG. 3 is a diagram of an exemplary box tool 310 overlaying an edge 305 at the boundary of a shaded area 308 in an image 300 (e.g., on an image display device). The graphical user interface of the box tool 310 may include a region of interest (ROI) indicator 311, polarity indicator arrows 314 along the side, and an edge selector 312 that is positioned on to the desired edge to be detected. Within the box tool 310, nominal scan lines 320 may be indicated, which the box tool 310 generates and uses for determining edge points. Along each of the nominal scan lines 320, the box tool operates to determine an edge point of the underlying feature, as previously described for the scan line 220 of the point tool 210 of FIG. 2. As shown in FIG. 3, and as will be described in more detail below, a line 325 may be fit to the set of determined edge points, to determine the measurement location and orientation of the edge 305.

In operation, the box tool 310 is selected, and configured to identify an edge feature to be detected. The ROI indicator 311 may be positioned, sized and rotated by an operator, such that the measurement ROI includes the portion of the edge feature to be detected and the edge selector 312 may be positioned to more precisely identify the edge to be detected, at a desired location along the edge. The ROI indicator 311 may be oriented on the displayed image to define and indicate a desired scan line orientation across the edge, as indicated by the angle A in the illustrated x-y coordinate system in the upper right corner of FIG. 3. More generally, the orientation of the overall ROI indicator 311, the portions of the ROI indictor that include the arrows 314, or the orientations of the nominal scan lines 320 may each be used to define and/or indicate the scan line orientation. The arrows 314 define the polarity to be associated with the edge detection. Once the box tool 310 is completely configured, the instructions of an underlying edge point locating routine may be executed to perform operations that analyze intensity profile data to detect edge points along each of the scan lines and fit a line to the detected edge points, as described in greater detail below.

Figure 4:
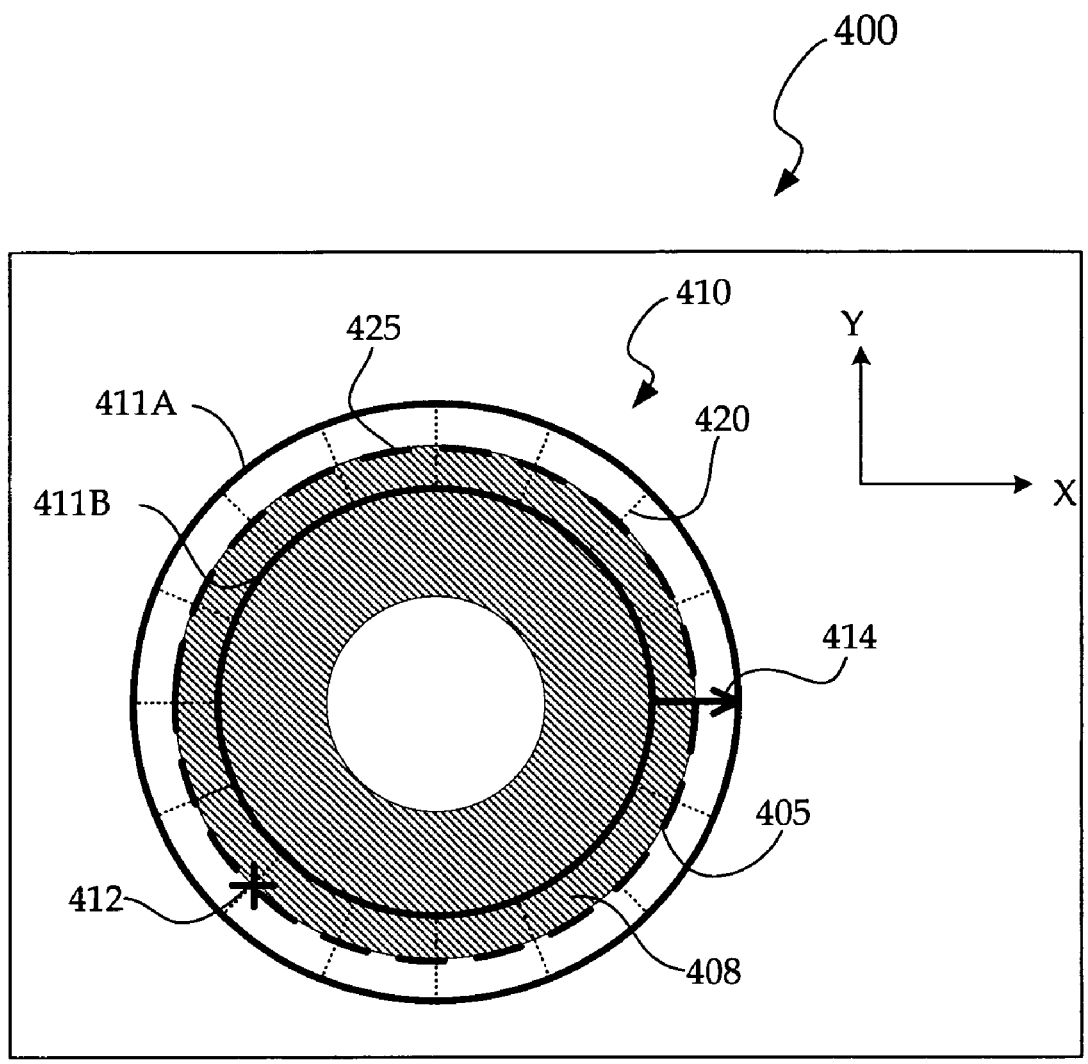
FIG. 4 is a diagram of an exemplary circle tool overlaying a circular edge in an image.

FIG. 4 is a diagram of an exemplary circle tool 410 overlaying a circular edge 405 at the boundary of a darker or shaded area 408 in an image 400 (e.g., on an image display device). The graphical user interface of the circle tool 410 may include an ROI indicator comprising an ROI outer circle 411A, an ROI inner circle 411B, an edge selector 412, and an arrow 414 which indicates the polarity to be associated with the edge detection for the circle tool 410. Nominal scan lines 420, which the circle tool 410 generates and uses for determining edge points, may be indicated at illustrated between the ROI inner circle 411B and the ROI outer circle 411A. Associated with each of the nominal scan lines 420, the circle tool may operate to find an edge point of the underlying feature, as previously described for the scan line 220 of the point tool 210 of FIG. 2. A circle 425 may be fit to the determined edge points, which determines the measurement location and radius of the circular edge 405.

The operation of the various features of the circle tool 410 are analogous to the similar features of the box tool 310 as described above with respect to FIG. 3, unless otherwise indicated by description or context. In operation, the circle tool 410 is selected, and configured to identify an edge feature to be detected. The ROI indicator may be positioned, and sized by an operator, such that the ROI inner circle 411B and the ROI outer circle 411A include the edge feature to be detected, and the edge selector 412 may be positioned to more precisely identify the edge to be detected, at a desired location along the edge. The arrow 414 defines the polarity to be associated with the edge detection. Once the circle tool 410 is completely configured, the instructions of an underlying edge point locating routine may be executed to perform operations that define the respective orientations of each of a plurality of radially oriented straight scan lines that are distributed at a plurality of angles around the ROI. Then, the routine analyzes intensity profile data values to detect edge points along each of the scan lines and fits a circle to the detected edge points, in a manner analogous to linear edge determining operations described further below. In contrast to the previously described tools, the orientation of the nominal radial scan lines determined and used by the circle tool 410 varies from scan line to scan line.

To summarize, in general, edge points are determined by various video tools, which may fit geometric forms to the edge points in order to measure corresponding underlying image features. In one conventional method of operating a video tool, depending on the type of tool (e.g., point/box/circle, etc.), one or more nominal scan lines are defined or generated within the ROI, according to defined tool parameters. For each nominal scan line, the tool determines or selects a set of intensity profile data point locations that approximate the nominal scan line. Intensity values associated with the data point locations are determined, to define the intensity profile associated with the nominal scan line. Then, in one embodiment, an edge detection algorithm analyzes gradients along the intensity profile to find the location along the intensity profile that corresponds to the maximum gradient magnitude, as described in more detail below with reference to FIG. 5, for example. The maximum gradient location along the intensity profile is used to determine the edge point location in the image that is associated with the nominal scan line. One exemplary implementation of this conventional method is described in greater detail below with reference to FIG. 6.

Figure 5:
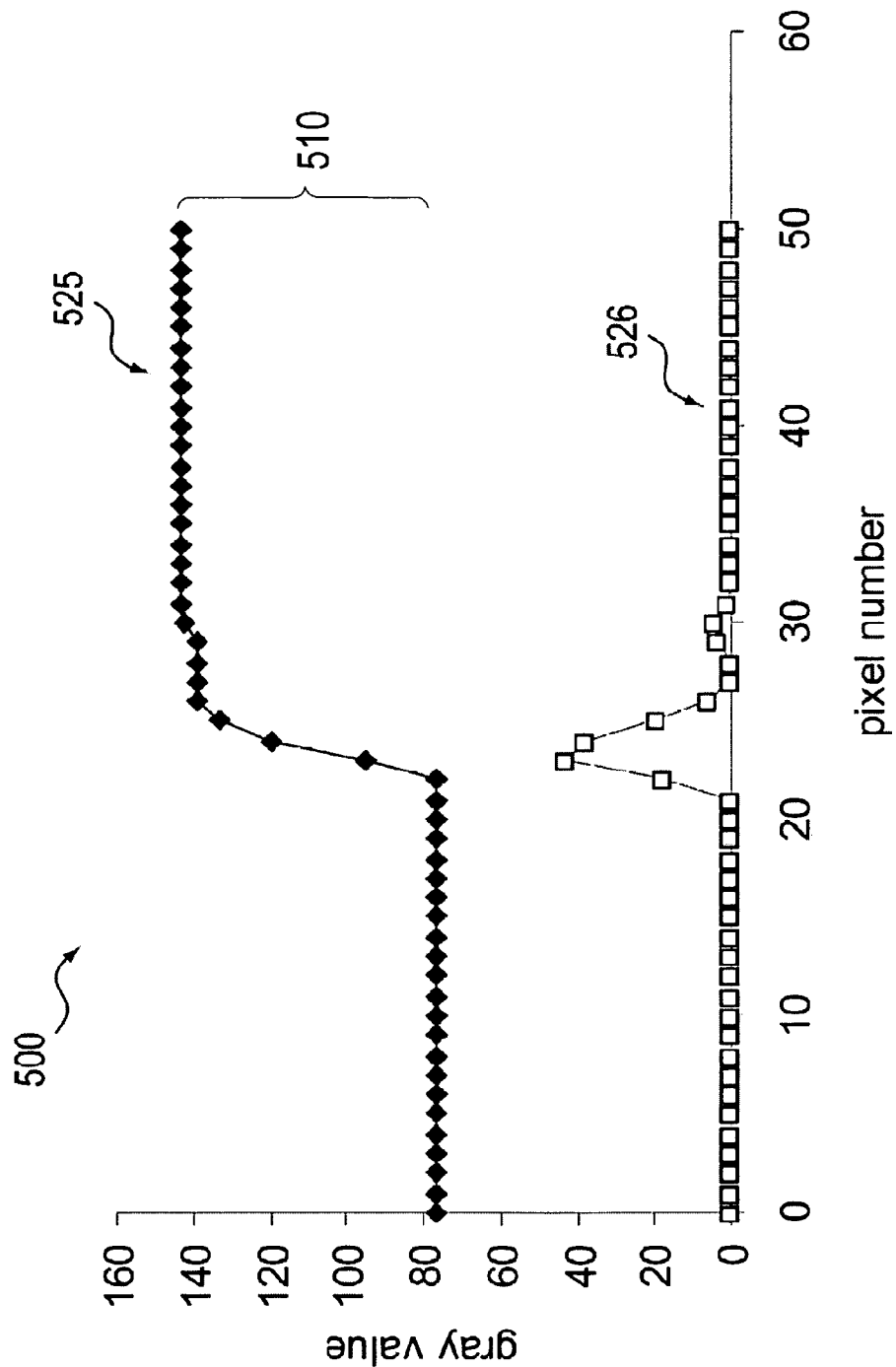
FIG. 5 is a diagram illustrating one exemplary method of determining an edge location based on a set of pixel intensity values.

FIG. 5 is a diagram of a graph 500 illustrating one exemplary method of determining an edge location based on an intensity profile. As shown in FIG. 5, the intensity profile 510 comprises a set of image pixel intensity (gray) values 525 corresponding to positions representing a scan line (e.g., such as one of the scan lines 220, 320, or 420 shown in FIG. 2, 3 or 4, respectively). The data points or positions representing the scan line are labeled as "pixel numbers" from 0-50 along the horizontal axis. Beginning from data point 0, the image intensity values initially indicate a relatively darker region up to approximately data point 23, which is then followed by a relatively lighter region up to data point 50.

Gradient magnitude values 526 are derived from the intensity values 525 and are also shown in FIG. 5. Various conventional algorithms find the location along the horizontal axis that corresponds to a peak of the gradient magnitude, and identify that location as an edge location. If there are multiple gradient magnitude peaks, then the video tool edge selector and/or orientation indicator (e.g., edge selector 212 and/or polarity indicator 214 of the point tool 210) can help the algorithm identify the desired peak. In FIG. 5, the maximum gradient criterion (that is, the gradient peak) indicates that the edge is located at approximately data point 23. By using methods that may include curve fitting, centroid determination, or the like, a gradient magnitude peak may be located relatively precisely between the intensity profile data points, which generally supports sub-pixel measurement resolution and repeatability when determining the location of the corresponding edge in the image.

Figure 6:
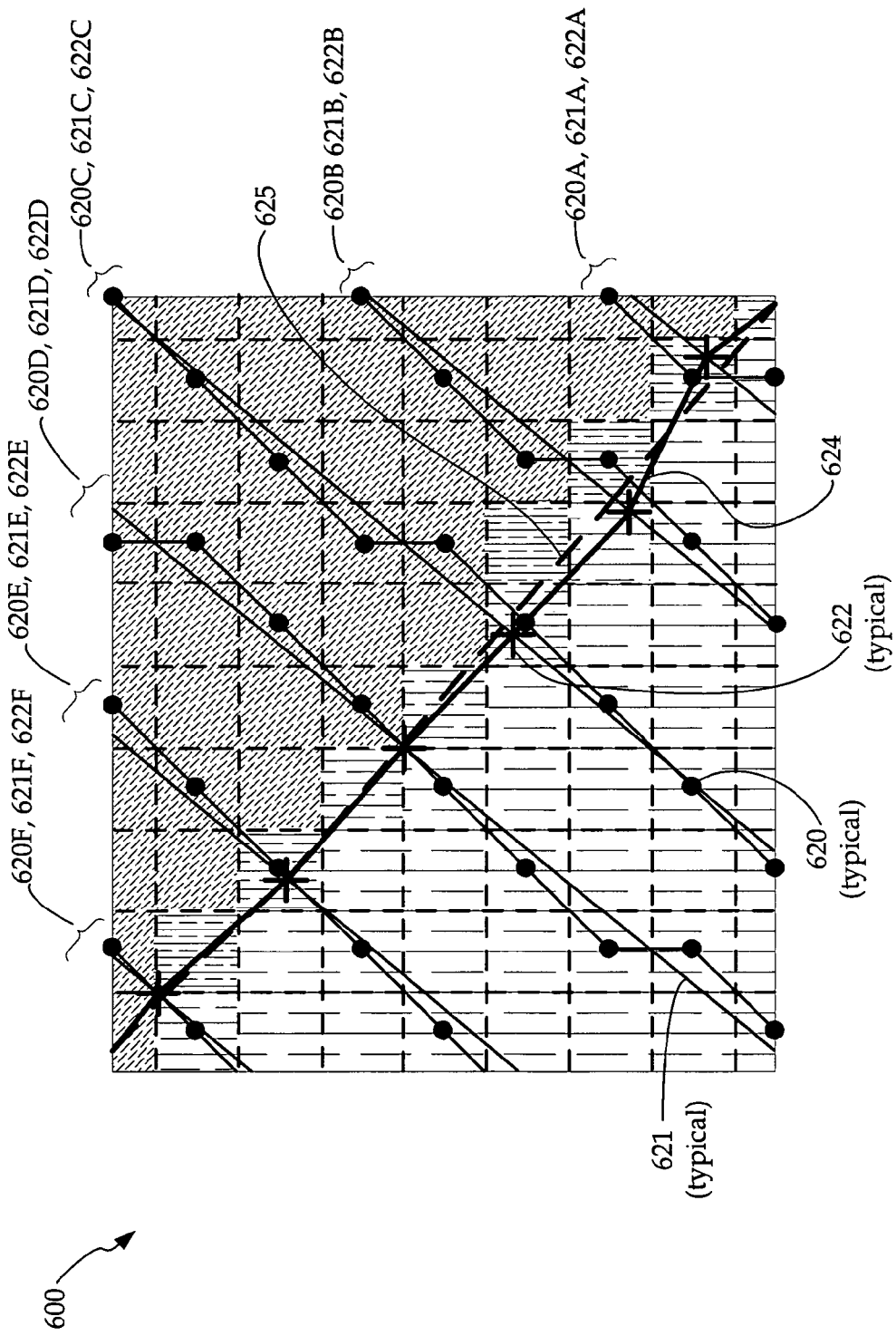
FIG. 6 is a diagram illustrating one prior art method for determining intensity profile data point values associated with a set of nominal scan lines for determining an edge location.

FIG. 6 is a diagram 600 illustrating one prior art method for determining intensity profiles (e.g., such as the intensity profile 510 shown in FIG. 5) that represent nominal scan lines, and determining the resulting edge locations. A small portion of an edge, and the surrounding image pixels, are shown extremely magnified in FIG. 6. FIG. 6 represents a small portion of a larger ROI (not shown). The image pixels are schematically represented as boxes bounded by dashed lines. The nominal location of a pixel is the center of the pixel. The intensity of each image pixel is crudely represented by the degree of shading within its box, where more shading represents lower intensity. Shown in FIG. 6 are respective scan line image pixel sets 620A-620F, each indicated by a set of pixel-center dots joined by one or more solid line segments, as typified by scan line image pixel set 620B. In the embodiment shown in FIG. 6, the respective scan line image pixels in the sets 620A-620F are selected to represent respective nominal scan lines, because they are the closest pixels to the nominal scan lines. The nominal scan lines are not shown in FIG. 6, however, they may be the same as the nominal scan lines 723A-723F described below with reference to FIG. 7, which shows the same image. It should be appreciated that because FIG. 6 shows only a limited portion of an ROI, the illustrated scan line image pixel sets 620A-620F are "incomplete" sets, in that they generally do not show all the pixels included along a typical scan line within an ROI, and do not illustrate a number of pixels that is sufficient to provide accurate edge detection. However, their generic structure is representative of conventional methods, and they suffice for purposes of this explanation.

A set of scan line image pixels provides an intensity profile analogous to the intensity profile 510 described with reference to FIG. 5. They may be similarly analyzed to determine an edge location along the intensity profile. FIG. 6 also shows respective best fit lines 621A-621F, which in this case are lines parallel to the original nominal scan lines, and located for the best fit to their respective scan line image pixel sets. In this example, once an edge location has been determined with sub-pixel resolution between adjacent pixel numbers along an intensity profile, the corresponding (e.g., proportional) location between the corresponding scan line image pixels may be projected onto the corresponding best fit line (e.g., one of 621A-621F) to determine one of the detected edge points 622, which are represented by crosses connected by a bent solid line 624. FIG. 6 also shows a dashed best fit line 625 fitted to the detected edge points 622. The location of best fit line 625 determines the measured location of an underlying straight edge feature in the image. In an alternative embodiment, once an edge location has been determined between adjacent pixel numbers along an intensity profile, the corresponding location along the line joining the corresponding scan line image pixels is simply used as one of the detected edge points 622.

It should be appreciated that for purposes of illustration FIG. 6 shows a number of pixels that is greatly reduced and greatly magnified relative to a conventional ROI used for edge detection. Thus, FIG. 6 greatly exaggerates the deviations of the scan line image pixel sets 620A-620F from respective straight lines. If the pixels shown in FIG. 6 were displayed on a conventional display, the corresponding display region would be less than approximately 2 mm (0.1 inches) wide. Thus, in practice, the ROI is significantly larger than the block of pixels shown in FIG. 6, practical scan line image pixel sets include significantly more pixels, and the pixels in each set would appear to form a very straight line across a display device. It has been conventional to represent straight lines in pixel images by selecting the image pixels that best approximate the straight line, for example as illustrated by the scan line image pixel sets 620A-620F, or by using a well-known method known as Bresenham's algorithm, or the like. The previously described conventional methods have been satisfactory since they have provided good measurement resolution and repeatability, for example, on the order of $\frac{1}{10}$ to $\frac{1}{50}$ of the pixel spacing in an image.

However, error sources that were previously unrecognized and/or insignificant are becoming significant in recent systems and applications. It has been recognized that conventional methods of edge detection may return variable measurement results for a given feature depending on the orientation of the feature in the field of view. For example, such orientation-dependent measurement results have been found in association with the well-known Canny edge detector, as described in *The Accuracy of Sub-Pixel Localisation in the Canny Edge Detector*, by Peter Rocket, BMVC99, pp. 392-401. Rocket proposes that these errors associated with the Canny edge detector may be corrected by look-up tables. However, the Canny edge detector and the proposed correction method are not readily applicable or desirable in the context of video tools for use in general purpose precision machine vision inspection systems.

Figure 11:
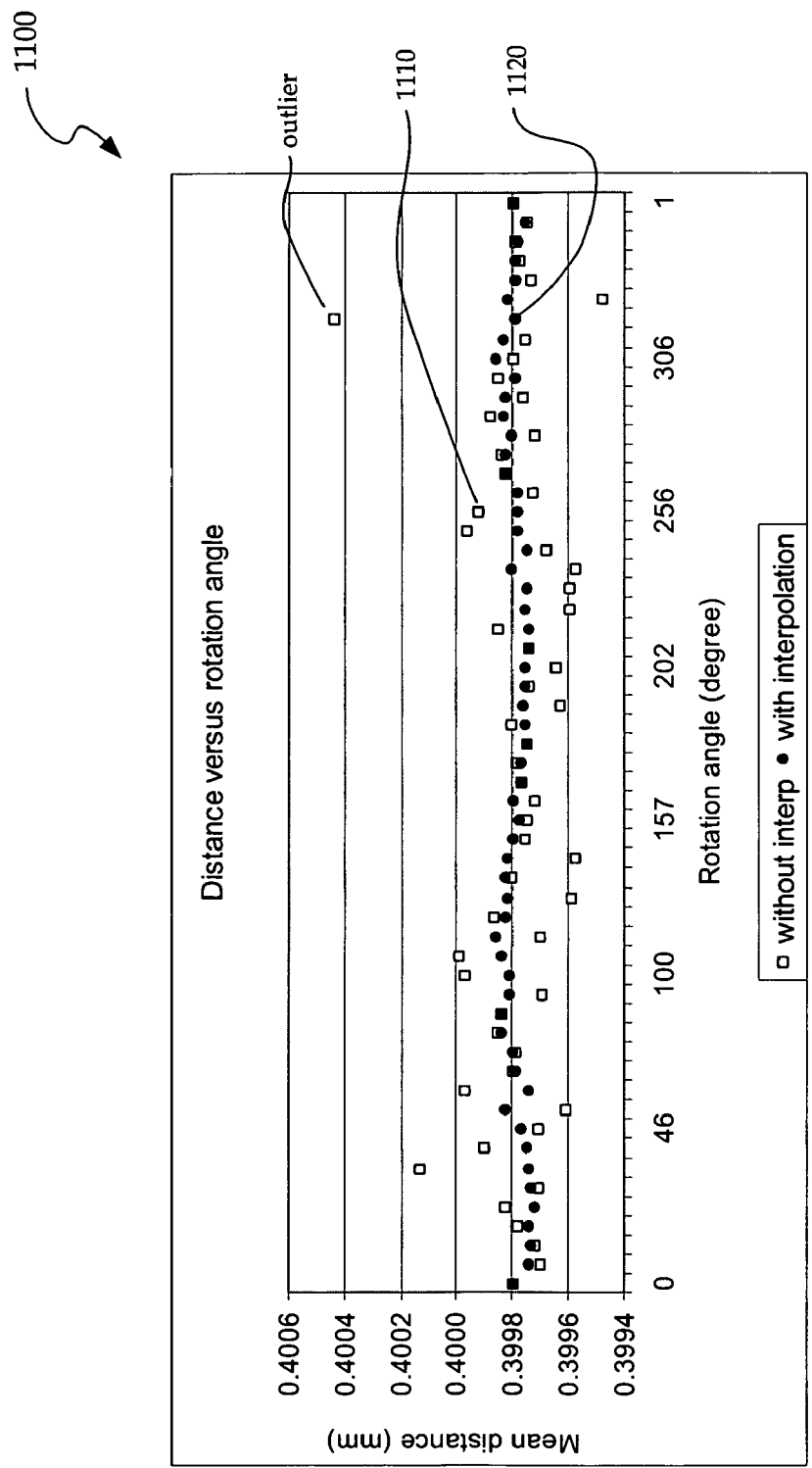
FIG. 11 is a diagram comparing point-to-line measurement results determined with the prior art method of FIG. 6 versus those determined with the method of FIGS. 7, 8 and 9.
Figure 12:
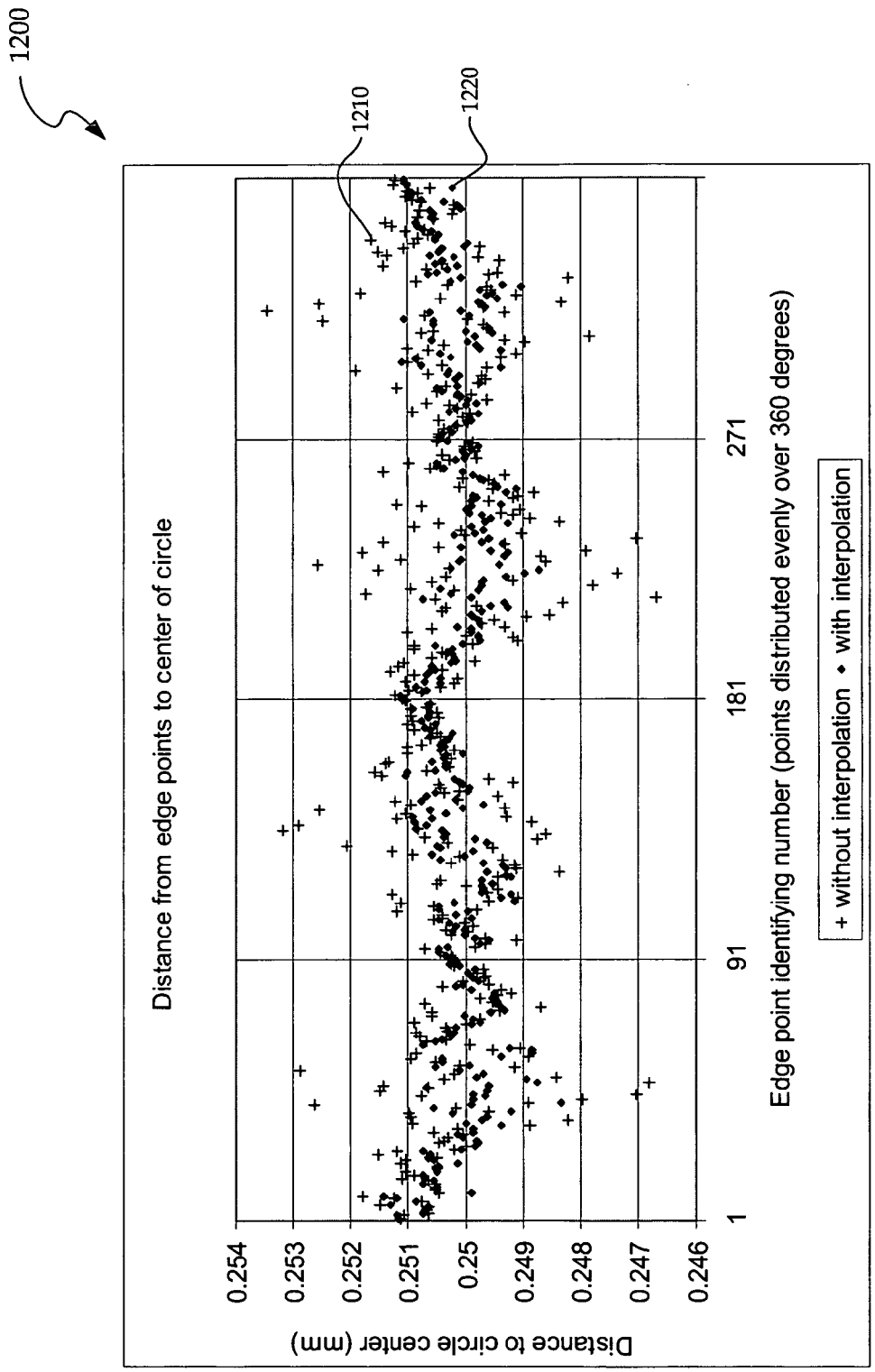
FIG. 12 is a diagram comparing circle measurement results determined with the prior art method of FIG. 6 versus those determined with the method of FIGS. 7, 8 and 9.

Sub-pixel orientation-dependent measurement variations have also now been recognized in association with the conventional method described above with reference to FIG. 5. Such measurement variations are depicted in FIGS. 11 and 12. Methods for reducing or eliminating errors that contribute to these measurement variations are now described.

Figure 7:
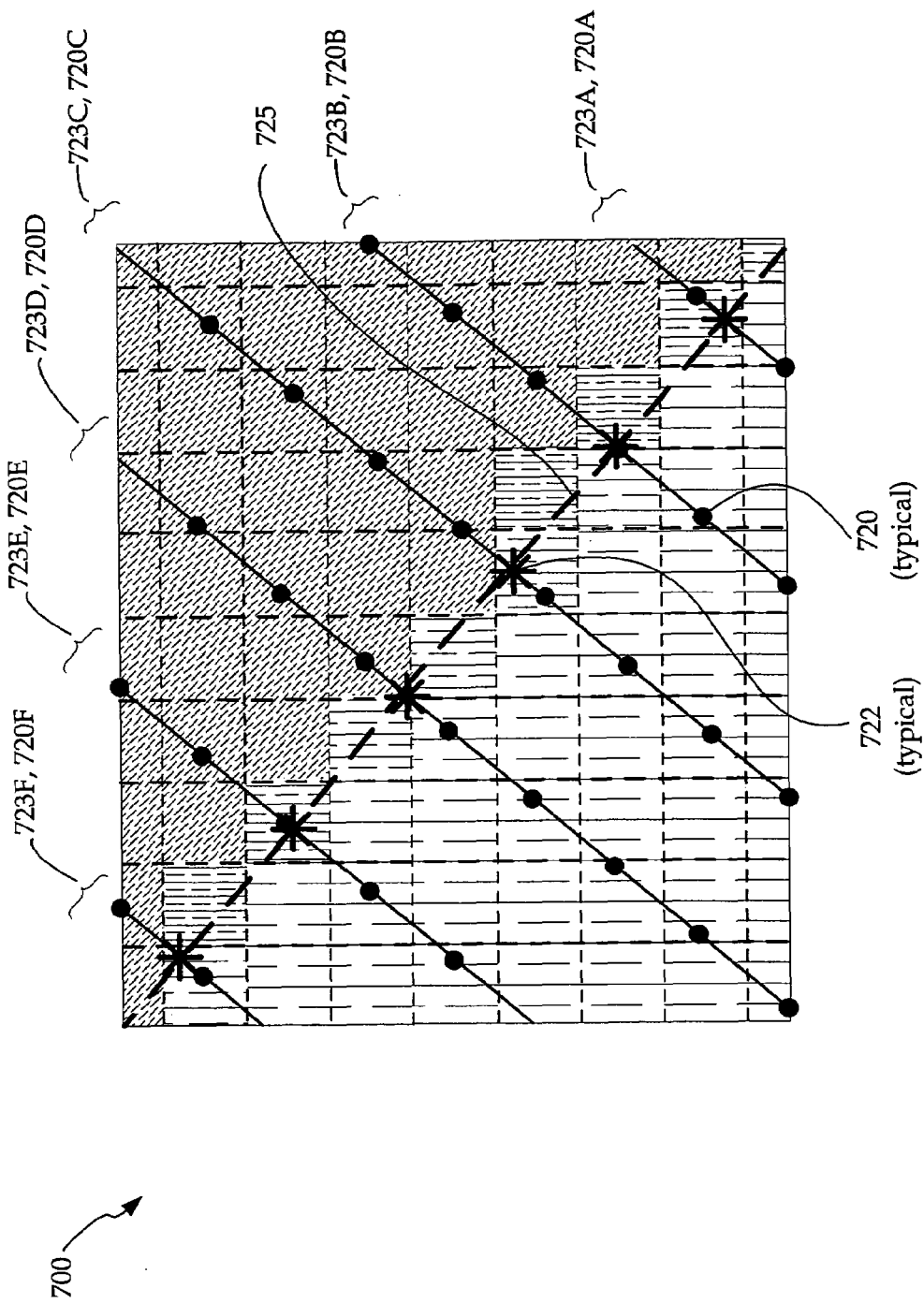
FIG. 7 is a diagram illustrating one exemplary improved method according to the present invention for determining intensity profile data point values associated with a set of nominal scan lines for determining an edge location.

FIG. 7 is a diagram 700 illustrating one exemplary improved method according to the present invention for determining intensity profiles that represent nominal scan lines, and determining the resulting edge locations. The improved method shown in FIG. 7 is efficient and robust in the context of video tools for use in general purpose precision machine vision inspection systems. FIG. 7 shows respective nominal scan lines 723A-723F. In various embodiments, nominal scan lines may be set parallel to the body 211 of the point tool 210 shown in FIG. 2, or perpendicular to the nominal centerline of the box tool 310 as shown in FIG. 3, or directed radially in the circle tool 410 as shown in FIG. 4. In various embodiments, nominal scan lines may be spaced apart equally at a specified number of locations throughout a video tool ROI, or may be spaced apart by specific distances in terms of a pixel spacing dimension, or absolute measurement units such as millimeters or degrees. More generally, nominal scan lines may be set according to any now-known or later-developed method that may be used to provide a usable number of scan lines and orient the scan lines at a usable or preferred orientation across an edge to be detected (e.g., approximately perpendicular to the edge).

Respective scan line data point sets 720A-720F are indicated by respective sets of dots along the nominal scan lines 723A-723F. As shown in FIG. 7, within each of the scan line data point sets 720A-720F, the data points are selected to coincide with the nominal scan line and are co-linear with one another. The scan line data point sets 720A-720F are "incomplete" sets, in that they generally do not include enough pixels to provide accurate edge detection. However, they suffice for purposes of explanation. Because the scan line data points are constrained to be collinear, rather than to coincide with an image pixel location, the intensity associated with each data point must be estimated (e.g., interpolated) based on adjacent pixel intensities, as described in greater detail below. The resulting set of scan line data points provides an intensity profile analogous to the intensity profile 510 described with reference to FIG. 5. The intensity profile may be similarly analyzed to determine an edge location (e.g., the maximum gradient magnitude location) along the intensity profile.

It should be appreciated the method described above allows the construction of a one-dimensional (1D) intensity profile that corresponds to an intensity profile along a straight line (in this case, a nominal scan line) through the two-dimensional (2D) image. Thus, the edge location found in the 1D intensity profile may be mapped directly back onto the straight line through the 2D image, without introducing significant approximations or errors. It will be noted that the detected edge points 722 fit the best fit line 725 very well.

In contrast, the conventional method described with reference to FIG. 6 constructs a 1D intensity profile using intensity data that does not quite correspond to an intensity profile along a straight (1D) line through the 2D image. Thus, the edge location found in the 1D intensity profile cannot be mapped directly back onto the 2D image without including some approximation or error. The approximation or error is worse when a scan line image pixel set includes a "2D bend" in the vicinity of the edge to be detected, as illustrated by the poor linear fit the edge points 622 associated with the scan line image pixel sets 620A-620C shown in FIG. 6.

Figure 8:
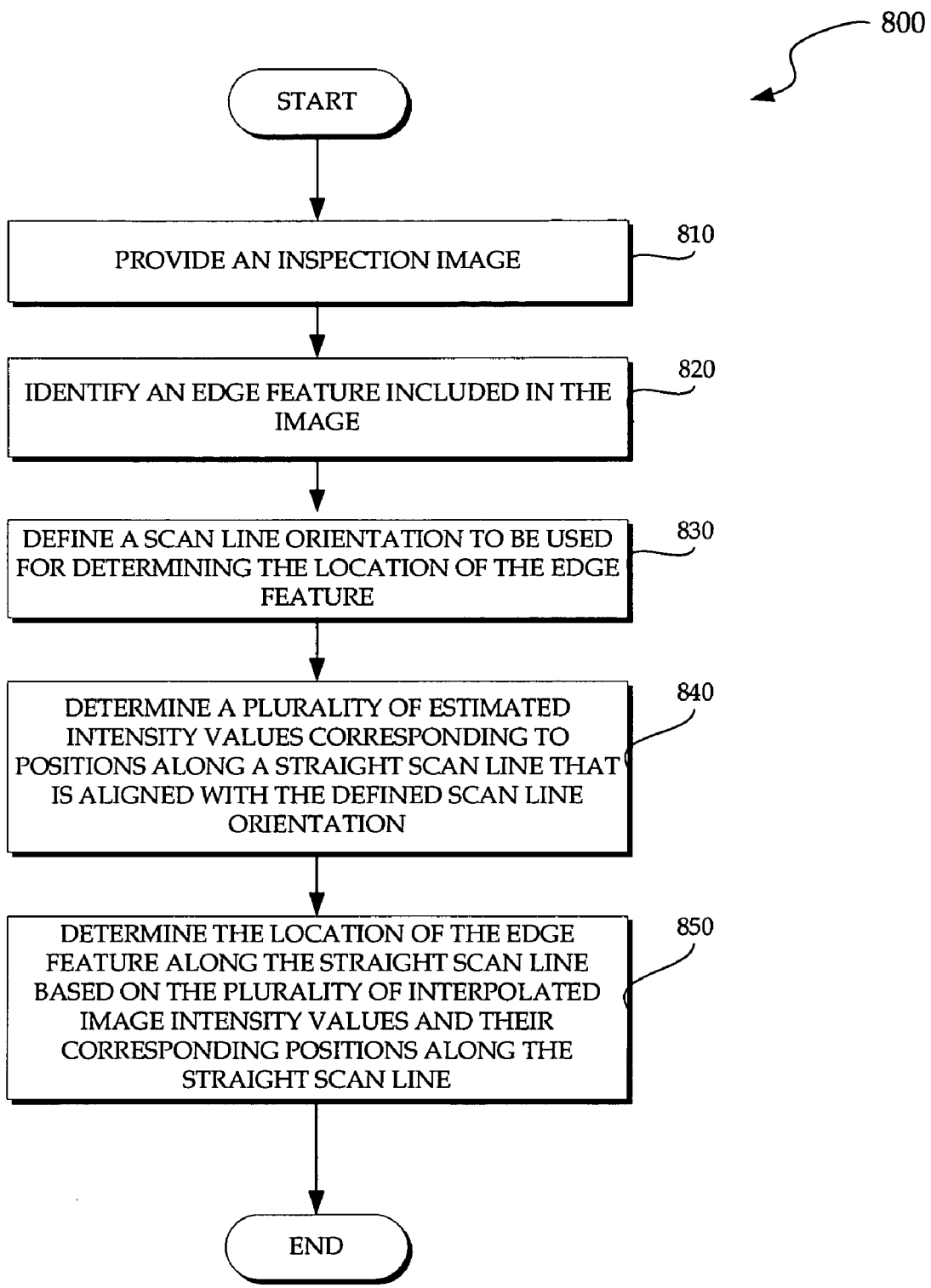
FIG. 8 is a flow diagram illustrating one exemplary embodiment of routine usable to implement the improved method of FIG. 7.

FIG. 8 is a flow diagram illustrating one exemplary embodiment of a routine 800 for implementing the improved method of FIG. 7. As shown in FIG. 8, at a block 810 an inspection image is provided. At a block 820, an edge feature that is included in the image is identified. At a block 830, a scan line orientation is defined which is to be used for determining the location of the edge feature. At a block 840, a plurality of interpolated image intensity values are estimated corresponding to positions along a straight scan line that is aligned with the defined scan line orientation. At a block 850, the location of the edge feature is determined along the straight scan line based on the plurality of interpolated image intensity values and their corresponding positions along the straight scan line. The routine 800 may be implemented as instructions included in one or more edge locating routines that underlie (are included in) the video tools outlined herein. The instructions may be executed during video tool operations, to control a machine vision inspection system to perform the corresponding operations.

Figure 9:
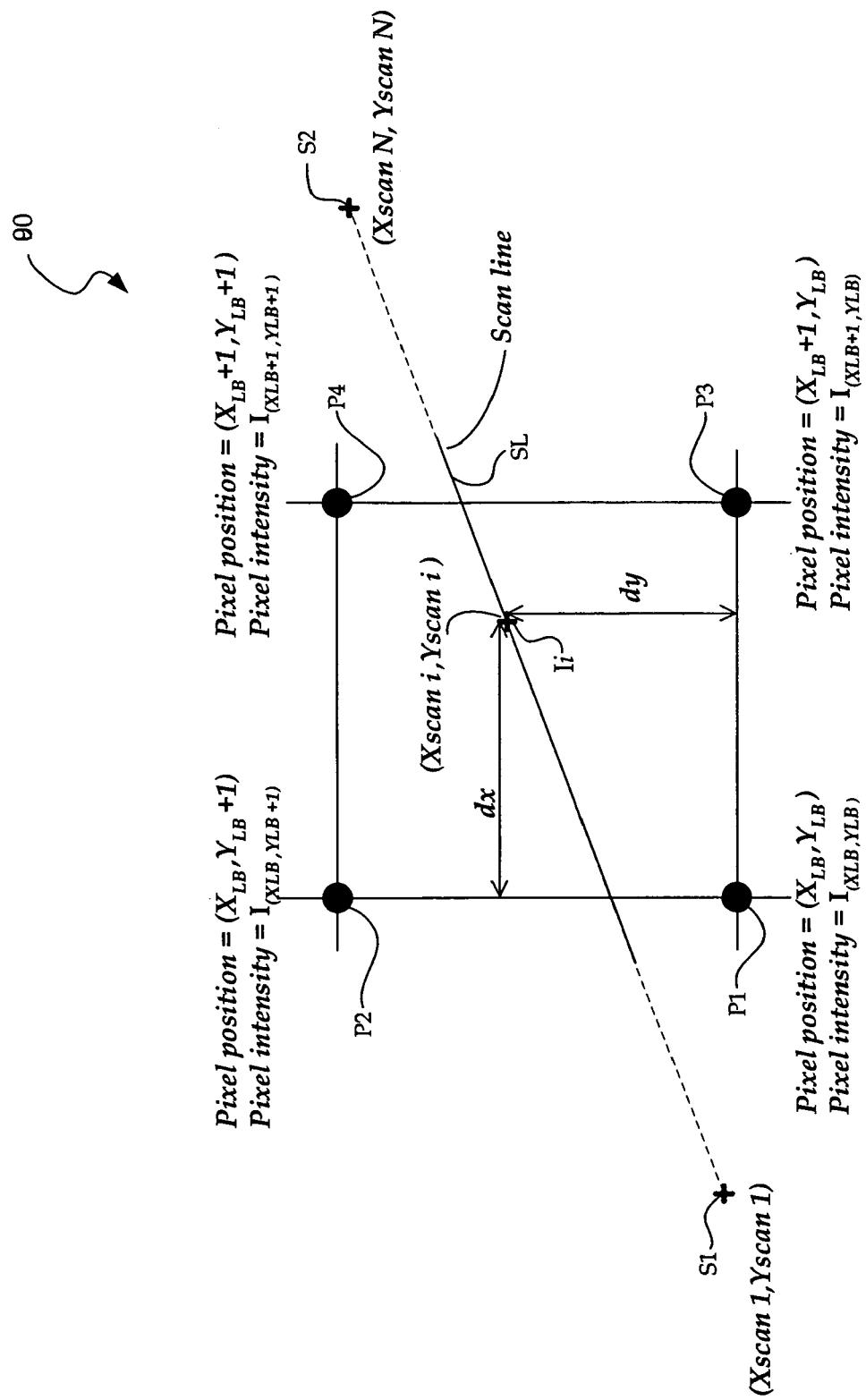
FIG. 9 is a diagram illustrating an exemplary embodiment of an interpolation method usable for determining intensity values in the method of FIGS. 7 and 8.

FIG. 9 is a diagram 900 illustrating an exemplary embodiment of an interpolation method useable for estimating intensity values at positions along a straight line in the method of FIGS. 7 and 8. As shown in FIG. 9, the four nearest neighbor pixel centers P1, P2, P3 and P4 form a square pattern around the data point Ii, whose intensity is to be estimated. Scan line end points S1 and S2 are shown to define a straight line SL. The intensity data point Ii is shown located at a horizontal distance dx and a vertical distance dy from the pixel P1 along the scan line SL.

The positions and pixel intensities at various points are defined as follows. The pixel P1 has a pixel position=$(X_{LB}, Y_{LB})$ and a pixel intensity=$I_{(XLB, YLB)}$. The pixel P2 has a pixel position=$(X_{LB}, Y_{LB}+1)$ and a pixel intensity=$I_{(XLB, YLB+1)}$. The pixel P3 has a pixel position=$(X_{LB}+1, Y_{LB})$ and a pixel intensity=$I_{(XLB+1, YLB)}$. The pixel P4 has a pixel position= $(X_{LB}+1, Y_{LB}+1)$ and a pixel intensity=$I_{(XLB+1, YLB+1)}$. The scan line end point S1 has a position (Xscan 1, Yscan 1) and the scan line end point S2 has a position (Xscan N, Yscan N). The intensity data point Ii has a position (Xscan i, Yscan i).

As indicated in FIG. 9, and as will be described in more detail below with regard to FIGS. 10A and 10B, interpolation may be used for estimating the intensity value to be associated with an intensity data point Ii. In one embodiment of the interpolation method, the estimated intensity of each data point Ii (I=1, 2, 3 . . . ) along the scan line SL is calculated using the intensities of its four nearest neighbors as indicated by the following equation.

$$I_{(Xscan\ i,\ Yscan\ i)} = d_x[d_y I_{(XLB+1,\ YLB+1)} + (1-d_y)I_{(XLB+1,\ YLB)}] + (1-d_x)[d_y I_{(XLB+1,\ YLB+1)} + (1-d_y)I_{(XLB,\ YLB)}] \quad \text{(Eq. 1)}$$

where it will be understood that dx and dy correspond to the particular intensity data point whose intensity value is being estimated. An equivalent form that may be used as an alternative to EQUATION 1 is included at step 1025 of FIG. 10A.

Figure 10A:
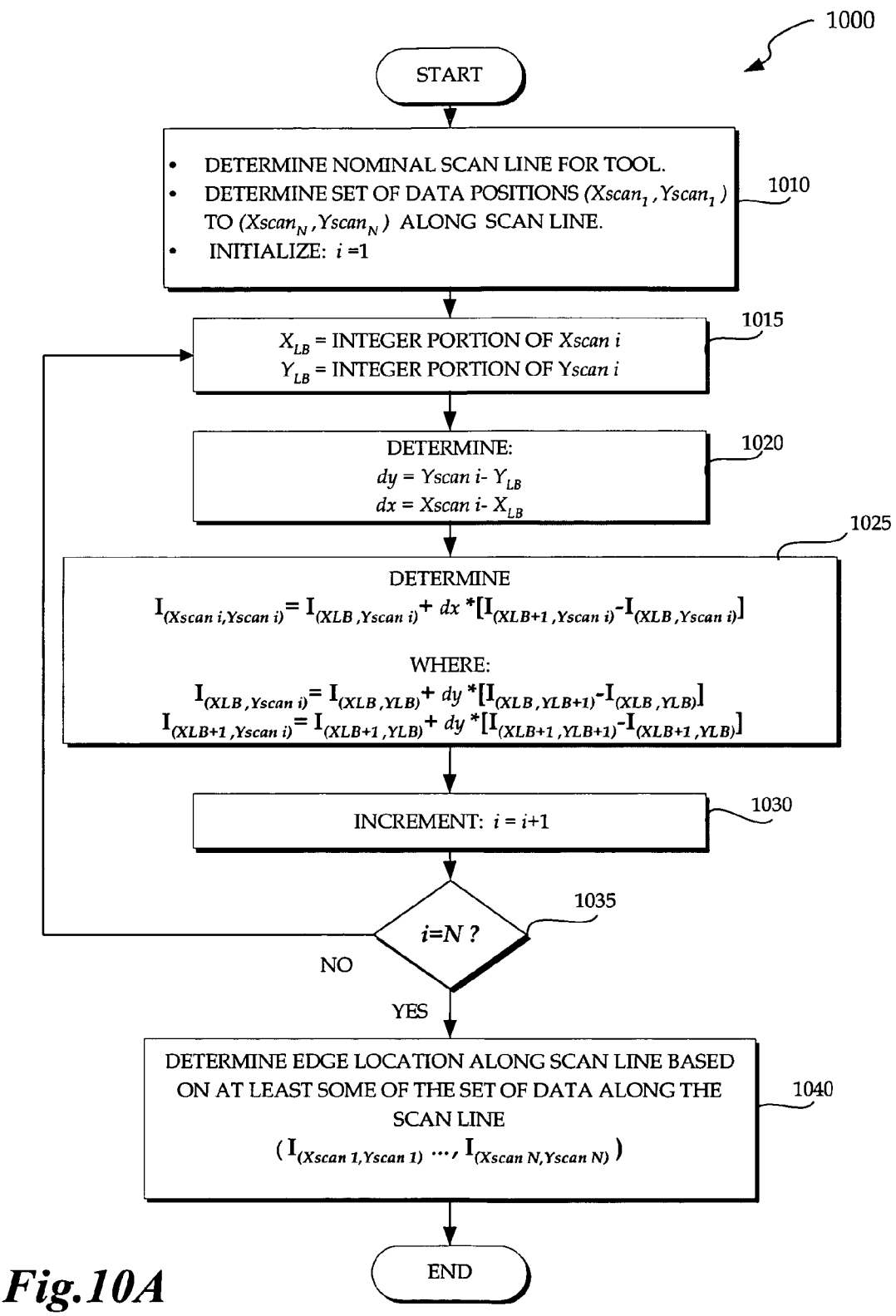
FIG. 10A is a flow diagram illustrating a first exemplary embodiment of a routine for determining intensity profile data point values along a straight scan line according to the present invention using bilinear interpolation and determining the resulting edge points, in the method of FIGS. 7 and 8.

FIG. 10A is a flow diagram illustrating an exemplary embodiment of a routine 1000 for estimating intensity profile data point values along a straight scan line using bilinear interpolation and determining the resulting edge point(s) in the method of FIGS. 7 and 8. As shown in FIG. 10A, at a block 1010, a nominal scan line for a video tool is determined, a set of intensity profile data point positions (Xscan 1, Yscan 1) to (Xscan N, Yscan N) are determined along the scan line, and an initialization is made of i=1. At a block 1015, variables are set such that $X_{LB}$=integer portion of Xscan i and $Y_{LB}$=integer portion of Yscan i. At a block 1020, a determination is made of dy=Yscan i−$Y_{LB}$ and dx=Xscan i−$X_{LB}$. At a block 1025, a determination is made of $I_{(Xscan\ i,\ Yscan\ i)} = I_{(XLB,\ Yscan\ i)} + dx*[I_{XLB+1,\ Yscan\ i} - I_{(XLB,\ Yscan\ i)}]$ where $I_{(XLB,\ Yscan\ i)} = I_{(XLB,\ YLB)} + dy*[I_{(XLB,\ YLB+1)} - I_{(XLB,\ YLB)}]$ and $I_{(XLB+1,\ Yscan\ i)} = I_{(XLB+1,\ YLB)} + dy*[I_{(XLB+1,YLB+1)} - I_{(XLB+1,YLB)}]$. At a block 1030, i is incremented to become i=i+1. At a decision block 1035, a determination is made as to whether i=N. If i does not equal N, then the routine returns to block 1015. If i does equal N, then the routine continues to a block 1040. At block 1040, a determination is made of the edge location along the scan line based on at least some of the set of data $(I_{(Xscan\ 1,\ Yscan\ 1)} \ldots, I_{(Xscan\ N,\ Yscan\ N)})$ along the scan line, for example by methods previously described for finding an edge location along an intensity profile.

Figure 10B:
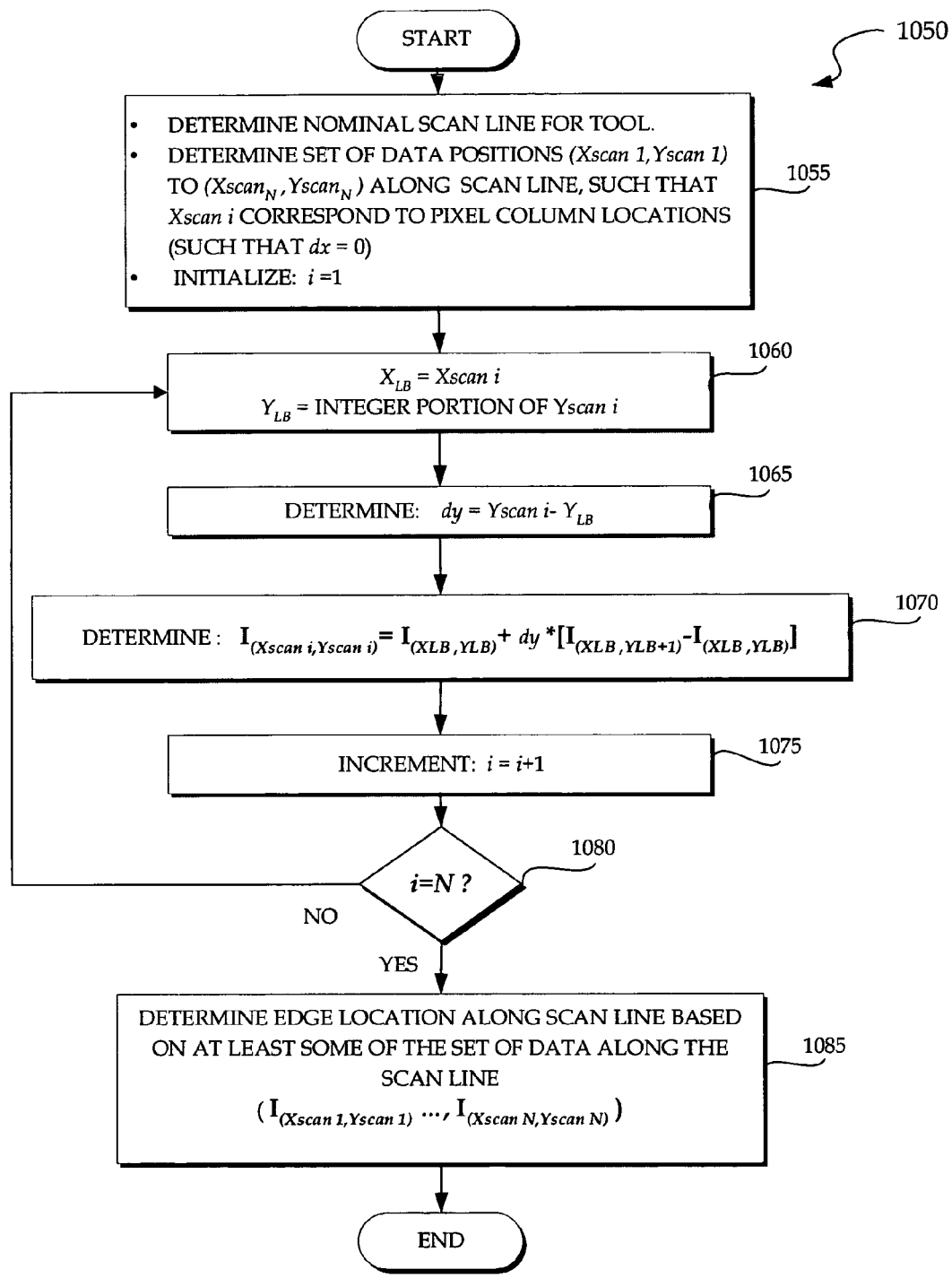
FIG. 10B is a flow diagram illustrating an exemplary embodiment of a routine for determining intensity profile data point values along a straight scan line according to the present invention using constrained data point positions and linear interpolation along at least one coordinate direction and determining the resulting edge points in the method of FIGS. 7 and 8.

FIG. 10B is a flow diagram illustrating an exemplary embodiment of a routine 1050 for estimating intensity profile data point values along a straight scan line using constrained data point positions and linear interpolation along at least one coordinate direction and determining the resulting edge points in the method of FIGS. 7 and 8. As shown in FIG. 10B, at a block 1055, a nominal scan line is determined for a video tool, and a set of intensity profile data point positions (Xscan 1, Yscan 1) to (Xscan N, Yscan N) are determined along the scan line, such that all Xscan i correspond to pixel column locations (such that dx=0) and an initialization is made of i=1. At a block 1060, variables are set such that $X_{LB}$=Xscan i and $Y_{LB}$=integer portion of Yscan i. At a block 1065, a determination is made of dy=Yscan i−$Y_{LB}$. At a block 1070, a determination is made of $I_{(Xscan\ i,\ Yscan\ i)} = I_{(XLB,\ YLB)} + dy*[I_{(XLB,\ YLB+1)} - I_{(XLB,\ YLB)}]$. At a block 1075, i is incremented to become i=i+1. At a decision block 1080, a determination is made as to whether i=N. If i does not equal N, then the routine returns to block 1060. If i does equal N, then the routine continues to a block 1085. At block 1085, a determination is made of the edge location along the scan line based on at least some of the set of data $(I_{(Xscan\ 1,\ Yscan\ 1)} \ldots, I_{(Xscan\ N,\ Yscan\ N)})$ along the scan line.

It will be appreciated that the routine 1050 is an alternative that is similar to the routine 1000, but improves the efficiency of the interpolation operations for estimating the intensity associated with data points positioned along a straight line. In an alternative embodiment that provides similar benefits, the routine 1050 could be modified to interchange the roles of the x and y coordinates, such that all Yscan i correspond to pixel row locations (such that dy=0). In a further embodiment, alternating intensity profile data point positions could be selected along the scan line such that dx=0 for a data point, dy=0 for a subsequent data, and so on. Any of the routines or operations outlined above may be implemented as instructions included in one or more edge locating routines that underlie (are included in) the video tools outlined herein. The instructions may be executed during video tool operations, to control a machine vision inspection system to perform the corresponding operations.

FIG. 11 is a diagram 1100 comparing dimensional measurements of the distance between an edge point and a linear edge, for an implementation of the conventional edge detection method of FIG. 6 versus measurements determined with the improved method that includes estimating an intensity profile for positions along a straight line, as described with reference to FIGS. 7, 8 and/or 9. The results for the conventional method ("without interpolation") are indicated by the box data points 1110, while the results for the improved method ("with interpolation") are indicated by the dot data points 1120. As shown in FIG. 11, the peak-to-peak variation of these dimension measurements, at various orientations covering a 360 degree range, was reduced from approximately 0.6 µm (excluding 1 outlier) for the conventional method to approximately 0.15 µm for the improved method according to this invention, a significant improvement.

FIG. 12 is a diagram 1200 comparing dimensional measurement results determined for an implementation of the conventional edge detection method of FIG. 6 versus those obtained with improved method that includes estimating an intensity profile for positions along a straight line, as described with reference to FIGS. 7, 8, and/or 9. The measurement results were obtained by measuring sixteen 500 um-diameter circles using a circle video tool. For each circle, 360 edge points were detected and then fit to a circle. The distance from each edge point to the fitted circle center is shown, wherein the results for the conventional method ("without interpolation") are indicated by the cross data points 1210, while the results for the improved method ("with interpolation") are indicated by the dot data points 1220. It will be appreciated that each of the 360 edge points is detected using different radial scan line orientation. As can be seen, the variations or errors of the distance measurements obtained using the improved method of the present invention are significantly reduced compared to the results obtained using the conventional method.

It should also be appreciated that although the foregoing disclosure has described a monochromatic image for clarity of description, edge detection in an image comprising interspersed color pixels, for example an image comprising red, green and blue color channel pixels, may be performed in an analogous manner. As one example, the different color channel images may be treated as monochromatic images in a shared, overall, coordinate system. Each of the color channel images may be analyzed as previously described, and the resulting measurements from each of the channels may be combined by averaging, or other appropriate methods, in the overall coordinate system. In another example, the color channels may be combined according to known methods to provide a suitable "monochromatic" pseudo-image, which may be analyzed according to the foregoing methods.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A method for determining the location of an edge feature in an inspection image of a workpiece acquired by a machine vision inspection system, the method comprising using a computer to perform the following steps comprising:
   a) identifying an edge feature included in the image;
   b) defining a scan line orientation to be used for determining the location of at least one edge point of the edge feature;
   c) determining a plurality of estimated image intensity values corresponding to positions along a straight line that is aligned with the defined scan line orientation; and
   d) determining the location of the edge point along the straight line based on the plurality of estimated image intensity values and their corresponding positions along the straight line.

2. The method of claim 1, wherein determining the plurality of estimated image intensity values comprises estimating the image intensity values using bilinear interpolation.

3. The method of claim 2, wherein for each of the positions along the straight line, the bilinear interpolation is performed utilizing the image intensity values of the four nearest neighbor pixels to the position.

4. The method of claim 1, wherein at least one of the positions along the straight line is determined such that it nominally coincides with either a pixel row or a pixel column.

5. The method of claim 4, wherein when one of the positions along the straight line is determined such that it nominally coincides with a pixel row, then estimating the image intensity value corresponding to that position comprises linear interpolation between the image intensity values of the two nearest neighbor pixels in the same pixel row.

6. The method of claim 4, wherein when one of the positions along the straight line is determined such that it nominally coincides with a pixel column, then estimating the image intensity value corresponding to that position comprises linear interpolation between the image intensity values of the two nearest neighbor pixels in the same pixel column.

7. The method of claim 1, wherein steps a) and b) are performed by configuring a video tool displayed on a display of the image, and steps c) and d) are performed by an edge point locating routine of the video tool, the routine comprising:
   instructions that control the machine vision inspection system to perform operations for determining a plurality of estimated image intensity values corresponding to positions along a straight line that is aligned with the defined scan line orientation and that estimate the image intensity values by interpolating between the image intensity values of image pixels that are nearest neighbors for each of the positions along the straight scan line; and
   instructions that control the machine vision inspection system to perform operations for determining the location of the edge point along the straight line based on the plurality of estimated image intensity values and their corresponding positions along the straight line.

8. The method of claim 7, wherein identifying an edge feature included in the image comprises positioning an edge-identifying element of a graphical user interface of the video tool on a display of the image.

9. The method of claim 8, wherein the video tool is one of a point tool and a box tool, and defining a scan line orientation to be used for determining the location of at least one edge point of the edge feature comprises orienting a scan line orientation indicating element of a graphical user interface of the video tool on a display of the image.

10. The method of claim 8, wherein:
   the video tool is a circle tool;
   the edge point locating routine comprises scan line determining instructions that control the machine vision inspection system to perform operations that define the respective orientations of each of a plurality of radially oriented straight scan lines that are distributed at a plurality of angles around the region of interest;
   defining a scan line orientation to be used for determining the location of at least one edge point of the edge feature comprises executing the scan line determining instructions; and
   the operations for determining a plurality of estimated image intensity values corresponding to positions along a straight line that is aligned with the defined scan line orientation comprise operations that determine a plurality of estimated image intensity values corresponding to positions along each of the plurality of radially oriented straight scan lines.

11. A video tool for determining the location of an edge feature in an inspection image of a workpiece acquired by a machine vision inspection system, the video tool comprising:
   graphical user interface means positionable on a display of the image for identifying an edge feature included in the image;
   means for defining a scan line orientation to be used for determining the location of at least one edge point of the edge feature; and
   means for locating an edge point comprising:
   means for controlling the machine vision inspection system to perform operations for determining a plurality of estimated image intensity values corresponding to positions along a straight line that is aligned with the defined scan line orientation; and
   means for controlling the machine vision inspection system to perform operations for determining the location of the edge point along the straight line based on the plurality of estimated image intensity values and their corresponding positions along the straight line.

12. The video tool of claim 11, wherein the operations for determining the plurality of estimated image intensity values corresponding to positions along a straight line comprise operations that estimate the image intensity values using bilinear interpolation.

13. The video tool of claim 11, wherein the operations for determining the plurality of estimated image intensity values corresponding to positions along a straight line comprise:
   operations that determine at least one of the positions along the straight line such that it nominally coincides with a pixel row; and
   value estimating operations such that when one of the positions along the straight line coincides with a pixel row, the value estimating operations estimate the image intensity value corresponding to that position using linear interpolation between the image intensity values of the two nearest neighbor pixels in the same pixel row.

14. The video tool of claim 11, wherein the operations for determining the plurality of estimated image intensity values corresponding to positions along a straight line comprise:
   operations that determine at least one of the positions along the straight line such that it nominally coincides with a pixel column; and
   value estimating operations such that when one of the positions along the straight line coincides with a pixel column, the value estimating operations estimate the image intensity value corresponding to that position using linear interpolation between the image intensity values of the two nearest neighbor pixels in the same pixel column.

15. The video tool of claim 11, wherein:
   the video tool is a point tool;
   the graphical user interface means comprises at least one of a point tool body and an edge selector;
   the means for defining the scan line orientation comprises the point tool body as oriented on the display of the image; and
   the operations for determining a plurality of estimated image intensity values corresponding to positions along a straight line that is aligned with the defined scan line orientation comprise operations that determine the straight line such that it is collinear with the point tool body and that estimate the image intensity values by interpolating between the image intensity values of image pixels that are nearest neighbors for each of the positions along the straight line.

16. The video tool of claim 11, wherein:
   the video tool is a box tool;
   the graphical user interface means comprises at least one of a region of interest indicator and an edge selector;
   the means for defining the scan line orientation comprises at least one of the region of interest indicator as oriented on the display of the image, a box tool orientation indicator as oriented on the display of the image, and a scan line indicator on the display of the image; and
   the operations for determining a plurality of estimated image intensity values corresponding to positions along a straight line that is aligned with the defined scan line orientation comprise:
   operations that determine a plurality of straight scan lines that are aligned parallel to the defined scan line orientation and distributed within the region of interest; and
   operations that determine a plurality of estimated image intensity values corresponding to positions along each of the plurality of straight scan lines and that estimate the image intensity values by interpolating between the image intensity values of image pixels that are nearest neighbors for each of the positions along each straight scan line.

17. The video tool of claim 11, wherein:
   the video tool is a circle tool;
   the graphical user interface means comprises at least one of a region of interest indicator and an edge selector;
   the means for defining the scan line orientation comprises means included in the means for locating an edge point, for controlling the machine vision inspection system to perform operations that define the respective orientations of each of a plurality of radially oriented straight scan lines that are distributed at a plurality of angles around the region of interest; and
   the operations for determining a plurality of estimated image intensity values corresponding to positions along a straight line that is aligned with the defined scan line orientation comprise operations that determine a plurality of estimated image intensity values corresponding to positions along each of the plurality of radially oriented straight scan lines and that estimate the image intensity values by interpolating between the image intensity values of image pixels that are nearest neighbors for each of the positions along each straight scan line.

* * * * *